United States Patent [19]
Gloge et al.

[11] 4,105,283
[45] Aug. 8, 1978

[54] COMPENSATION FOR MATERIAL DISPERSION IN OPTICAL FIBERS

[75] Inventors: Detlef Christoph Gloge, Red Bank; Ivan Paul Kaminow, Tinton Falls; Herman Melvin Presby, Highland Park, all of N.J.

[73] Assignee: Bell Telephone Laboratories, Incorporated, Murray Hill, N.J.

[21] Appl. No.: 764,549

[22] Filed: Feb. 1, 1977

[51] Int. Cl.² .................................................. G02B 5/14
[52] U.S. Cl. ............................. 350/96.31; 350/96.34
[58] Field of Search ..................... 350/96 GN, 96 WG

[56] References Cited

U.S. PATENT DOCUMENTS

| 3,823,997 | 7/1974 | Gloge et al. | 350/96 GN |
|---|---|---|---|
| 3,877,783 | 4/1975 | Matsumura et al. | 350/96 GN |
| 3,904,268 | 9/1975 | Olshansky | 350/96 WG |
| 4,025,156 | 5/1977 | Gloge et al. | 350/96 GN |
| 4,033,667 | 7/1977 | Fleming, Jr. | 350/96 GN |

OTHER PUBLICATIONS

Applied Optics, vol. 15, No. 7, Jul. 76, by L. Cohen, pp. 1808–1814.

*Primary Examiner*—John K. Corbin
*Assistant Examiner*—Stewart Levy
*Attorney, Agent, or Firm*—Bruce S. Schneider

[57] ABSTRACT

It has been found that in a profiled optical waveguide for guiding a finite spectrum of light, reduction of total dispersion is possible by forming the overall profile in the waveguide as a composite of at least two profiles of different contour. The profiles contributing to the composite are formed for example through polarizability or density gradations in the waveguide.

5 Claims, 8 Drawing Figures

COMPENSATION FOR MATERIAL DISPERSION IN OPTICAL FIBERS

BACKGROUND OF THE INVENTION

Optical fibers have become a promising medium for use in optical communication systems. An exemplary class of fibers is composed of a core portion which is surrounded by a cladding region of refractive index smaller than that of the core. Within this general class of fibers, various designs have been used.

One approach is the use of multimode fibers. The diameters of these fibers are relatively large, typically tens of microns, and can support the propagation of a large number of modes. Each mode carries a fraction of the total light power transmitted through the waveguide. Since each guided mode has a different velocity along the longitudinal axis of the fiber, the light power in each such mode necessarily traverses the fiber in a different time period. Thus, a narrow pulse of light initially introduced in the fiber will emerge as a long series of closely spaced overlapping short pulses. The overall effect is a dispersed emergent pulse.

An approach adopted to reduce modal dispersion in a multimode fiber is to grade the refractive index of the core region. For example, one suggested class of refractive index profiles follows the equation $$n(r) = n_o[1 - 2\Delta(r/a)^\alpha]^{\frac{1}{2}}$$

where $n_o$ is the refractive index at the center of the core, $a$ is the radius of the core, $\Delta$ is a measure of the refractive index difference between the center of the core and the cladding defined by $(n_o - n_c)/n_o$, and $n_c$ is the refractive index of the cladding.

The choice of exponent $\alpha$ determines the particular profile of the class. Typically $\alpha$ is chosen equal to an $\alpha_{opt}$ which substantially reduces modal dispersion at a predetermined wavelength. For example a suggested $\alpha_{opt}$ is $$\alpha_{opt} = 2 + \epsilon \text{ where } \epsilon = -\frac{2n_o}{N_0} \frac{\lambda \Delta'}{\Delta}$$

where $\lambda$ is the wavelength of the guided light, $\Delta'$ is the derivative of $\Delta$ with respect to wavelength, $N_o$ is equal to $n_o - \lambda n_o'$ and $n_o'$ is the derivative of $n_o$ with respect to wavelength. (See, for example, Olshansky and Keck *Appl. Opt.*, 15 (2) 1483 (1976), U.S. Pat. No. 3,904,268 and Gloge, Kaminow and Presby, *Electronics Letts.*, 11, 19 (1975).) In such graded fibers the refractive index increases from the cladding to the center of the core. Modes whose energy is concentrated nearer to the cladding in a profiled fiber are induced to move faster relative to those modes concentrated closer to the center of the core. The former modes which in the case of a step function refractive index profile would emerge after the lower order modes, emerge essentially together with these modes. Thus total dispersion associated with a source emitting in a very narrow wavelength range, for example 1 Angstrom, is indeed often substantially decreased merely through adjustment of the refractive index profile of the fiber as discussed above. However, dispersion effects resulting from the nonmonochromatic character of the guided light are not usually corrected by such refractive index profile adjustments.

The refractive index produced in a fiber whether through a density or polarizability effect is a function of light wavelength. Thus the delay time of any given mode traversing the fiber will be different for different wavelengths. In a broader spectrum of guided light the shortest wavelength often causes a significantly different traversal time for a given mode than the longest wavelength. The resulting dispersion is a wavelength dependent effect called material dispersion. Additionally, since the refractive index is a function of wavelength, the profile, in most cases, produces the best reduction of modal dispersion for only one wavelength of the guided light. These wavelength dependent effects often become quite significant when a broader spectrum of light, e.g. 200 Angstroms and broader, is guided. Improvement in the information carrying capacity of an optical communication system for a broad spectrum of guided light requires further corrections entailing considerations beyond the overall refractive index profile of the fiber.

SUMMARY OF THE INVENTION

In an optical fiber communication system, it is desirable to minimize total dispersion. For example, one significant advantage of decreased dispersion is that an increase in the rate of data transmittance can be obtained.

As discussed earlier, methods have been devised to help correct for dispersion produced by modal delay. However, broadening, for sources with spectral ranges of at least 5 Angstroms, can occur despite these corrections. The subject invention entails the recognition that under appropriate conditions modal delay is used to compensate for material dispersion and consequently to reduce total dispersion. The conditions necessary to produce this compensation effect is defined in terms of a parameter $\alpha$ which defines a general refractive index profile, $n(r)$, represented in a simplified form by $$n(r) = n_o[1 - \Delta(r/a)^\alpha]$$

where $n_o$ is the refractive index at the center of the core, $\Delta$ is $(n_o - n_c)/n_o$, $n_c$ is the refractive index of the cladding and $a$ is the radius of the core. In general, the $\alpha$ which gives a substantial reduction of modal dispersion, $\alpha_{opt}$, is wavelength dependent. Compensation of modal dispersion for material dispersion occurs if $(\lambda_o - \lambda)(\alpha_{opt} - \alpha_{actual})$ is positive for substantially all $\lambda \neq \lambda_o$ of the guided light where $\alpha_{actual}$ is the $\alpha$ which defines the profile of a given fiber and $\lambda_o$ is the wavelength at which $\alpha_{opt} = \alpha_{actual}$. As shown in FIG. 1 the preceding condition for compensation occurs if $\alpha_{opt}$ (represented by 1) is greater than $\alpha_{actual}$ (represented by 2) for $\lambda$ less than $\lambda_o$, and if $\alpha_{opt}$ is less than $\alpha_{actual}$ for $\lambda$ greater than $\lambda_o$.

Assuming a fiber satisfies the condition for compensation, the extent of compensation attained depends on $\Delta$ and the rate of divergence of $\alpha_{opt}$ and $\alpha_{actual}$ around $\lambda_o$ which in turn is a function of the contributions used to produce the overall profile of the fiber. The invention further entails the recognition that for presently attainable values of $\Delta$ advantageous compensation is attained by using two or more contributions to the overall composite refractive index with differently shaped refractive index profiles attributable to at least two of these contributions.

DETAILED DESCRIPTION

1. Physical Description

Figure 1:
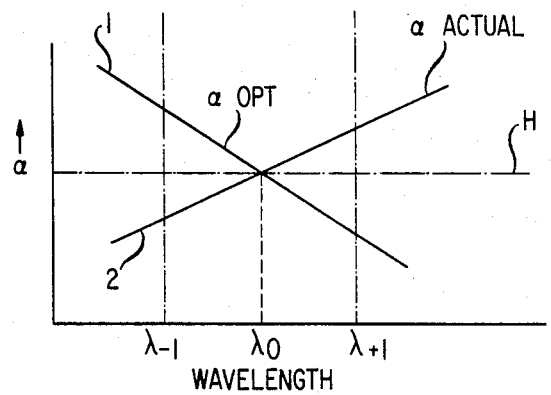
FIGS. 1–5 and 8 are for illustration of the compensation effect occurring in the practice of the invention.

The subject invention depends on the interplay of delays related to mode and material dispersion. The delay time of the lowest order modes is dependent on wavelength, and the contributions used to produce the composite refractive index along the longitudinal axis of the fiber. Examples of such contributions include introducing variations in the polarizability and/or the density of the fiber by means such as doping. Typically, the delay of the lowest order mode decreases as $\lambda$ increases. Thus, assuming for simplicity, a fiber is guiding only three wavelengths of light, $\lambda_{-1} < \lambda_o < \lambda_{+1}$, the delay of the lowest order mode of each wavelength is denoted in FIG. 2 by points C, B, and A, respectively. For all typical methods of producing a refractive index profile in a fiber, i.e., for all typical contributions, delay time of the lowest order mode (related to material dispersion) increases with decreasing wavelength of the guided light. The amount of increase in delay time depends on the method used to produce the profile. For example, when dopants are used the delay depends on the particular dopant and the concentration of that dopant along the longitudinal axis of the fiber.

In addition to the delay times of the lowest order modes, other wavelength dependent conditions are involved. As discussed previously, a profiled fiber is utilized to affect the velocity of the modes so that all modes of a chosen wavelength emerge from the fiber within a short time interval. For the general class of profiles $n(r) = n_o[1 - \Delta(r/a)^\alpha]$ produced in a fiber, there is a $\alpha_{opt}$ (a function of wavelength) at which an appreciable equalization of mode traversal time occurs. For wavelengths at which $\alpha_{actual}$ is greater than $\alpha_{opt}$ the velocity of higher order modes associated with such wavelengths is not increased sufficiently and these modes are late in arriving relative to lower order modes. Conversely, if $\alpha_{actual}$ is less than $\alpha_{opt}$ a given mode arrives before modes of lower order. (Modal delay of the lowest order modes is not changed significantly by variations between $\alpha_{opt}$ and $\alpha_{actual}$ since these modes effectively see essentially only the constant refractive index environment along the longitudinal axis of the fiber.)

The overall effect of these delays can now be considered. For $\lambda_o$ the fiber is made so that $\alpha_{actual}$ is essentially equal to $\alpha_{opt}$. All the modes of this wavelength, $\lambda_o$, emerge from the fiber within a short time period and traverse the fiber with a time delay, T. Therefore, the light intensity emerging from the fiber at time T after insertion of the light includes essentially the entire intensity of the $\lambda_o$ wavelength light. (This is indicated by line E in FIG. 2). For guided light of wavelength other than $\lambda_o$ the modes do not emerge within as short a time period. The delay of each mode relative to the lowest order mode (whose delay time is related to material dispersion) depends on the relationship of $\alpha_{opt}$ to $\alpha_{actual}$ with change in wavelength. As explored previously, if $\alpha_{opt}$ is greater than $\alpha_{actual}$ the mode delay time decreases with increasing mode order. (The converse is true for $\alpha_{opt}$ less than $\alpha_{actual}$.) For a fiber which has refractive index profile properties as shown by the solid lines in FIG. 1, the delay of modes for light of wavelength $\lambda_{+1}$ increases from the lowest order mode to the highest. This is shown by the triangle denominated G in FIG. 2.

Figure 2:
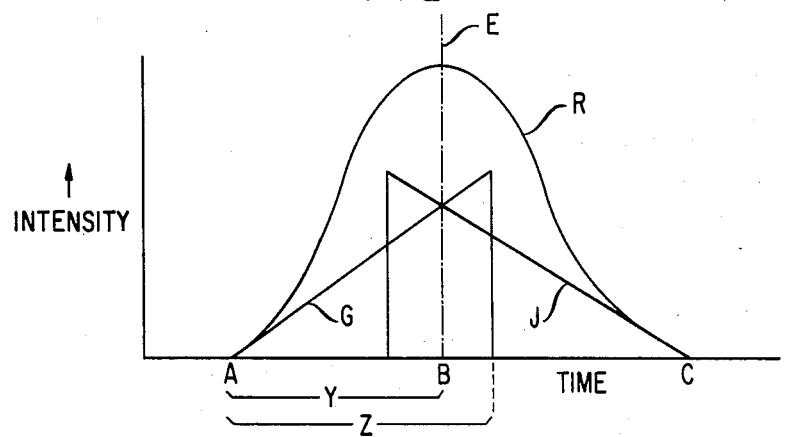

Additionally, it has been shown that the greatest intensity of light appears when the higher order modes emerge from a uniformly excited fiber i.e., a fiber where all the modes carry an equal amount of power. (See Gloge and Marcatili, *Bell System Technical Journal*, 52, 1563 (1973).) In the example of FIGS. 1 and 2 the higher modes and thus the greatest intensity of light for wavelength $\lambda_{+1}$ emerge closer to the traversal time for the modes of wavelength $\lambda_o$. For guided light of wavelength $\lambda_{-1}$, $\alpha_{opt}$ in FIG. 1 is greater than $\alpha_{actual}$ so that the higher order modes have a shorter delay time than the lower order modes. Therefore, triangle J in FIG. 2 represents the intensity distribution of light of wavelength $\lambda_{-1}$ emerging from the fiber. Line R is a summation of intensity distributions assuming a continuum of wavelengths between $\lambda_1$ and $\lambda_{-1}$ and represents the emergent pulse. It can be seen that the modal delay has compensated to a degree for the delay associated with material dispersion and decreased the RMS width of the emergent pulse.

Figure 3:
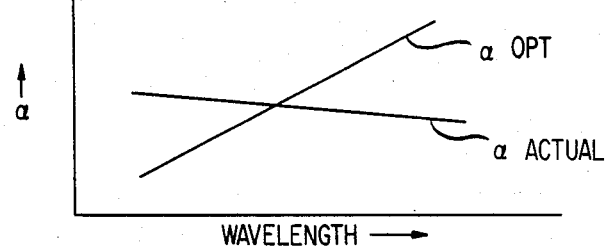
Figure 4:
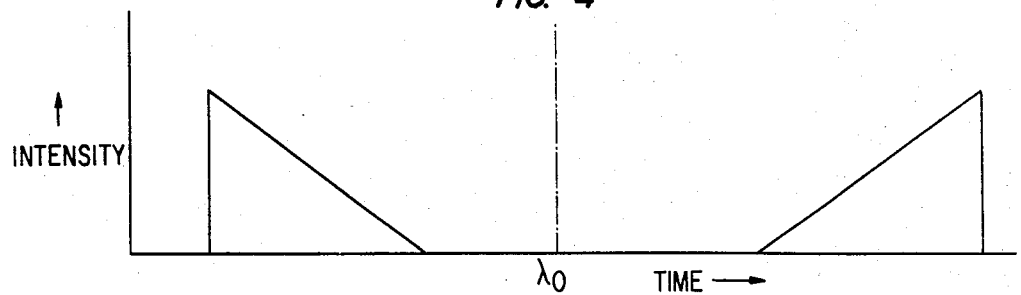

By a similar analysis, if the properties of the fiber were changed so that they were represented by the graphs in FIG. 3, modal and material dispersion augment each other and the distribution of FIG. 4 would be obtained. Thus, for compensation to occur, $\alpha_{opt}$ must be greater than $\alpha_{actual}$ for $\lambda$ less than $\lambda_o$ and less than $\alpha_{actual}$ for $\lambda$ greater than $\lambda_o$, i.e., $(\lambda_o - \lambda)(\alpha_{opt} - \alpha_{actual})$ must be positive for substantially all guided wavelengths not equal to $\lambda_o$. The previous analysis assumes that delay associated with material dispersion increases as $\lambda$ decreases. This is the case for presently used methods of producing a refractive index profile. If the converse were true, $(\lambda_o - \lambda)(\alpha_{opt} - \alpha_{actual})$ would have to be negative to achieve compensation.

Once the condition for compensation is satisfied, the extent of compensation depends upon the contributions used to produce the overall refractive index gradient, i.e., the material or technique used to produce a refractive index gradation in the fiber, the refractive index profile attributable to each such contribution, and the refractive index difference between the center of the core and the cladding. The difference in delay time of the lowest and highest order modes at a particular wavelength is related first to the divergence of the $\alpha_{opt}$ and $\alpha_{actual}$ which in turn is dependent on the means used to produce the fiber profile and second to the $\Delta$ of the fiber. More specifically, the product of $\Delta$ and the divergence between $\alpha_{opt}$ and $\alpha_{actual}$ is related to the delay time of a mode and proportional to the difference in traversal time of the lowest and highest order mode associated with a particular wavelength.

Figure 5:
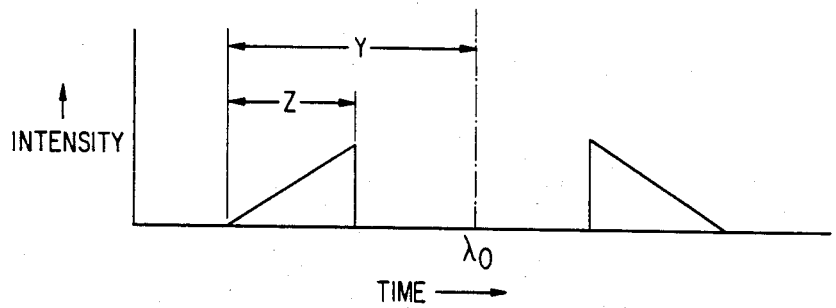
Figure 8:
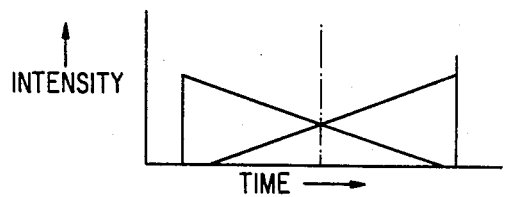

Significantly the difference in traversal time between the lowest and highest order mode in relation to the material dispersion determines the RMS width of the emergent pulse. For example if the delay associated with material dispersion (designated $y$ in FIG. 2) is greater than the difference between the traversal time of the lowest and highest order modes (designated $z$ in FIG. 2) the situation illustrated in FIG. 5 occurs. There is compensation and the RMS width is reduced. If time $y$ is slightly smaller than time $z$ the situation in FIG. 2 is presented. Here the intensity near the center of the pulse is increased and an improvement in RMS width over the previous situation is realized. An overlap of modes as shown in FIG. 2 is advantageous. However, an extreme overlap situation as shown in FIG. 8 where $z$ is much larger than $y$ is clearly inferior to the overlap case of FIG. 2. As can be seen from FIGS. 2, 5 and 8 the RMS width is a function of the ratio $z/y$. Assuming the condition for compensation is met, a gain in bandwidth is achieved for $z < y$. However further increase in bandwidth corresponding to favorable overlap is possible as the ratio $z/y$ approaches a value in the vicinity of 4/3. Again it should be emphasized that $z$ and thus the bandwidth is determined by the $\Delta$ and the divergence between $\alpha_{opt}$ and $\alpha_{actual}$, i.e., $\alpha_{opt} - \alpha_{actual}$, of the fiber.

Certain contributors to the refractive index gradient such as use of a single dopant e.g., germanium compounds, titanium compounds, or phosphorus compounds in presently practical concentrations produce only one contribution to refractive index, typically a variation in polarizability. Such a single contribution yields a linearly dependent refractive index change at all wavelengths. This means that in the case of a single dopant of this kind $d\alpha_{actual}/d\lambda$ is zero. (This is represented by the dotted line H in FIG. 1.) The profile of a fiber can be made from more than one index varying contribution. For typical contributions, if the profile associated with each contribution is the same, and thus of necessity the same as the composite profile, $d\alpha_{actual}/d\lambda$ is still zero. The magnitude of the divergence between $\alpha_{opt}$ and $\alpha_{actual}$ for these situations depends only on the change of $\alpha_{opt}$ with wavelength. This limits the value of $\alpha_{opt} - \alpha_{actual}$ obtainable. For practical $\Delta$'s, compensation in such systems, e.g., a single dopant system, or a multiple dopant system with the contribution from each dopant producing the same profile, is limited. Therefore, although compensation, and the resulting decrease in total dispersion occurs, more advantageous results are possible with other systems for producing the desired refractive index gradient.

A system employing two or more contributions to the refractive index gradient at least two of which have a different refractive index profile attributable to them affords the greatest possibility of achieving overlap. (It should be noted in such a system each of these unequal refractive index profiles is different from the composite profile.) For example one or more contributions to the overall fiber profile are made by varying the polarizability and/or the density. Exemplary of the various methods used to vary density or polarizability is the addition of dopants to the fiber. In such a multiple contribution system, the total refractive index profile, the sum of the profiles attributable to each contribution, is still made to substantially reduce modal dispersion at $\lambda_o$. Significantly, this type system produces a variation of $\alpha_{actual}$ with wavelength. That is, both $\alpha_{actual}$ and $\alpha_{opt}$ vary with wavelength. Hence larger values of $\alpha_{opt} - \alpha_{actual}$ are obtainable.

The $\Delta$ which gives the greatest reduction in total dispersion depends on the particular system, and the wavelength spectrum of the guided light. If the condition for compensation is satisfied, presently practical $\Delta$'s give a reduction in total dispersion. Generally, larger $\Delta$'s, e.g., $\Delta = 0.02$ and larger, are more advantageous.

2. Design

Although approximations are necessary, a mathematical development for the invention presented in the previous description is useful when contemplating design considerations for a specific system.

It is possible to make a fiber with a cladding refractive index, $n_c$, so that its core region having radius, $a$, possesses a refractive index of $n_o$ at its center and further that the refractive index, $n$, at any other point, $r$, is given approximately by $$n(r) = n_o(1 - \Delta f) \quad (1)$$

where $$\Delta = \frac{n_0 - n_c}{n_0}$$

$$f = \begin{cases} (r/a)^\alpha & r < a \\ 1 & r > a \end{cases}$$

(It might be noted that some literature references have used $n(r) = n_o(1 - 2\Delta f)^{\frac{1}{2}}$ where $$\Delta = \frac{n_0^2 - n_c^2}{2n_0^2}.$$

The form used above is the binomial expansion of this expression truncated after the linear term.)

A multimode theory of graded core fibers having a refractive index profile of the class represented by equation (1) has been investigated by Gloge and Marcatili, *Bell System Technical Journal*, 52 (9), 1563 (1973). Using this theory Olshansky and Keck (*Appl. Opt.* 15 (2), 483 (1976)) have derived an equation for a possible $\alpha_{opt}$ given by $$\alpha_{opt} = 2 + \epsilon \quad (2)$$

where $$\epsilon = -\frac{2n_0}{N_0} \frac{\lambda \Delta'}{\Delta},$$

and where $\Delta'$ and $N_o$ are as defined previously. (See equation (41) of the Olshansky paper.) For $\alpha_{actual}$ in the vicinity of $\alpha_{opt}$ the difference in traversal time between the lowest and highest order mode ($z$ of FIG. 2) in a fiber of length, $L$, is $$z = \frac{L}{c} \Delta N_0 \frac{\alpha_{actual} - \alpha_{opt}}{\alpha_{actual} + 2} \quad (3)$$

where $c$ is the speed of light in vacuo and $L$ is the length of the fiber. (This equation is derived from equation (39) of the Olshansky paper by subtracting the value obtained for $n=0$ from that obtained for $n=N$ and by ignoring terms of the order $\Delta^2$ and higher.)

The delay time associated with material dispersion has been treated by Gloge in *IEEE Trans. Micro. Theory Tech.*, 23 (1), 106 (1975). From equation (55) of that paper an expression for the half width of the material dispersion, ($y$ of FIG. 2) for a fiber of length $L$ can be derived. Changing the terms of Gloge equation (55) expressed in frequency units into wavelength units yields:

$$Y = \frac{L}{c}(\lambda_{-1} - \lambda_0)\lambda_0 \frac{d^2 n_0}{d\lambda^2} \quad (4)$$

where $\lambda_{-1}$ is the shortest wavelength of the guided light, $\lambda_o$ is the median wavelength of the guided light and where it is assumed the fiber is constructed to have $\alpha_{actual} = \alpha_{opt}$ at $\lambda_o$. (The treatment also holds if $\lambda_o$ is selected as any large-intensity wavelength within the spectrum of the guided light.)

Gloge and Marcatili (supra) have shown that near $\alpha_{opt}$ a monochromatic, narrow input pulse produces a triangular output pulse. Thus, a narrow input pulse containing an entire range of wavelengths yields a series of triangular responses each corresponding to a wavelength and each spanning a time period z, given by equation (3), e.g., the triangles G or J in FIG. 2. The relative time at which these triangular response pulses emerge from the fiber is fixed by the quantities y and z. Given the values of y and z the envelope of the emergent output pulses, denoted by R in FIG. 2, is determined. Assuming that the variation of $\alpha_{opt}$ and $\alpha_{actual}$ with $\lambda$ is linear and that the guided light is a continuum of uniform intensity, the root mean square width, $\sigma$, of this envelope can be calculated and is given approximately by $$\frac{\sigma}{\sigma_0} = (1 - \frac{4}{3}\frac{z}{y} + \frac{1}{2}\frac{z^2}{y^2})^{\frac{1}{2}} \quad (5)$$

where z and y are evaluated at $\lambda_{-1}$ and $\sigma_o$ is the root mean square pulse width in the absence of compensation.

It should be noted that the relative RMS width $\sigma/\sigma_o$ decreases as the ratio $z/y$ approaches 4/3. (As observed earlier advantageous compensation occurs when slight overlap is achieved, that is when z is slightly larger than y.) Therefore, the bandwidth of the fiber is tailored by an appropriate choice of $z/y$, i.e., by judiciously choosing (1) the multiple contribution system and, (2) the $\Delta$, to result in the desired value of $z/y$. Since a number of parameters are involved in fixing $z/y$ a multitude of fiber designs are possible.

There are restrictions, however, on this apparent flexibility in designing a fiber with the desired $z/y$. Most advantageously the design of a graded index should satisfy three requirements: (1) the condition for compensation must be met, (2) the degree of compensation should yield the transmission bandwith desired for a particular application and (3) the refractive index profile should substantially lessen modal dispersion at $\lambda_o$. Although not essential to the invention it is also desirable for the fiber to conform to a fourth requirement, i.e., (4) the graded index should follow a power law type profile (see equation (1)) for all wavelengths in the vicinity of $\lambda_o$. This last condition ensures the fulfillment of requirement (3) if $\alpha_{actual} = \alpha_{opt}$ at $\lambda_o$.

Requirement (4) is essentially satisfied if the profiles attributable to the two contributions to refractive index or the two combinations of contributions, $A_1$ and $A_2$, follow the laws $$A_1(r) = B_1 \alpha \, e(r/a)^\alpha \ln(a/r) \quad (6)$$

and $$A_2(r) = \Delta n_o[1-(r/a)^\alpha] - A_1(r) \quad (7)$$

where $B_1$ is the maximum value of $A_1(r)$, $a$ is the radius of the core of the fiber, $e$ is the base of the natural logarithm system and where $A_1(a) = A_2(a) = 0$ is set as the reference point for the value of the refractive index. Requirement four therefore fixes the class of refractive index profiles attributable to each contribution or combination of contributions.

As can be seen the remaining parameters which are not set by equations (6) and (7) are $\Delta n_o$, $B_1$, $\alpha$, and the particular contributions used to fabricate the fiber with the indicated class of profiles e.g., the particular dopants used. (Additionally, $B_1$ and $B_2$, the maximum refractive index values of $A_1(r)$ and of $A_2(r)$ respectively are interdependent.) Preferably requirement (3) is satisfied by making a fiber with $\alpha$ of equations (6) and (7) equal to the value of $\alpha_{opt}$ at $\lambda_o$. This fixes the particular profile used of the class of profiles defined by equations (6) and (7). For example, equation (2) is used as a suitable expression for $\alpha_{opt}$ and then used to set a value of $\alpha_{opt}$ at $\lambda_o$. This value at $\lambda_o$ is dependent in turn on the contributions, e.g., the particular dopants used in fabricating the fiber. It follows that after satisfying requirement (3) the only remaining independent parameters are $\Delta n_o$, $B_1$ or $B_2$, and the particular refractive index contributions used. Once these parameters are set the appropriate value of $\alpha$ is set by requirement (3) through the use of an expression such as equation (2) and the profiles attributable to each contribution or combination of contributions is further fixed by requirement (4) through the use of equations (6) and (7).

The remaining requirements, (1) and (2), furnish further constraints on and relationships between $B_1$, $\Delta n_o$, and the contributions used. For the profiles of equations (6) and (7) an expression for $d\alpha_{actual}/d\lambda$ can be derived from equation (30) of the Gloge-Marcatili paper (supra) and is given by $$\frac{d\alpha_{actual}}{d\lambda} = \frac{\alpha_{opt} e B_1}{\lambda \Delta n_0}(p_1 - p_2) \quad (8)$$

where $$p_1 = \frac{\lambda}{A_1}\frac{dA_1}{d\lambda} \text{ and } p_2 = \frac{\lambda}{A_2}\frac{dA_2}{d\lambda},$$

(Again contribution one or contribution two can signify a single contribution or a combination of contributions.) As explained earlier, for compensation to occur $d\alpha_{opt}/d\lambda$ should be larger than $d\alpha_{actual}/d\lambda$. Hence the equation $$B_1(p_1 - p_2) < \frac{\lambda \Delta n_0}{\alpha_{opt} e} \frac{d\Delta_{opt}}{d\lambda} \quad (9)$$

gives the condition for compensation, i.e., requirement 1. To obtain the greatest extent of compensation the quantity $(p_1 - p_2)$ should be positive. Most one-contribution systems have a $d\alpha_{actual}/d\lambda = 0$. (Illustrated by line H of FIG. 1.) A larger modal delay between the lowest order and highest order mode is obtained by increasing the divergence between $\alpha_{opt}$ and $\alpha_{actual}$. Thus any $d\alpha_{actual}/d\lambda$ with a positive value (see line 2, FIG. 1) increases this divergence over the one contribution case and in turn increases the modal delay between the lowest order and highest order mode. Since for practical $\Delta$'s, common one-contribution systems produce a limited compensation effect, improvement over such systems is possible by choosing contribution one to have a $p$ greater than contribution two. Because the quantities $p_1$ and $p_2$ and $d\alpha_{opt}/d\lambda$ depend only on the means used to produce the particular contribution, e.g., the dopant employed in the fiber, equation 9 establishes a relationship between the chosen means of producing the refractive index contribution, $B_1$, and $\Delta n_o$. Further in a preferred embodiment equation 9 should be satisfied by an appropriate choice of $B_1$, $\Delta n_o$ and contributions which yield a positive value for $(p_1-p_2)$.

Requirement (2) places another constraint on the choice of means of producing the contributions, on $B_1$ and on $\Delta n_o$. Once the bandwidth desired for the fiber is ascertained the appropriate value $z/y$ which yields this bandwidth (or which gives the best bandwidth attainable within the practice of the invention e.g., about $\frac{1}{3}\sigma_o$) is estimated from equation (5). Combining equations (3), (4) and (8) gives the equality $$B_1(p_1 - p_2) = \frac{z}{y} \frac{n_0}{N_0 e \alpha_{opt}} (\alpha_{actual}+2)\lambda_0^2 \frac{d^2 n_0}{d\lambda^2} + \frac{\lambda \Delta n_0}{\alpha_{opt} e} \frac{d\alpha_{opt}}{d\lambda} \quad (10)$$

where $p_1, p_2, d^2n_o/d\lambda^2$, $\alpha_{actual}$ and $d\alpha_{opt}/d\lambda$ are all evaluated at $\lambda_o$. Hence, once a ratio of $z/y$ is chosen to satisfy equation (5), equation 10 is used to obtain a second relationship between the means used to produce each contribution, $B_1$, and $\Delta n_o$.

Figure 6:
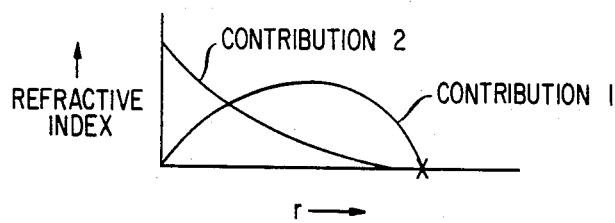
FIGS. 6 and 7 illustrate the design of fiber contours for producing compensation.
Figure 7:
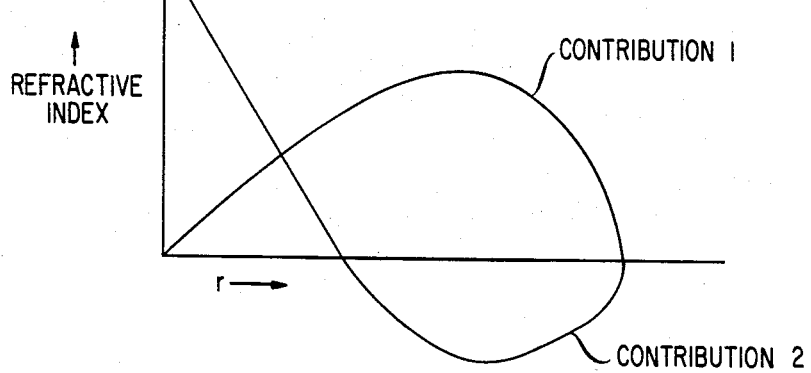

Two possible configurations of partial profiles satisfying equations (6) and (7) are shown in FIGS. 6 and 7. The construction of FIG. 6 applies when $B_2 \geq B_1 e$ where $B_2$ is the maximum value for $A_2(r)$. As can be seen from FIG. 6

$$\Delta n_o = B_2, \text{ for } B_2 \geq B_1 e \quad (11)$$

The second construction, shown in FIG. 7, can be used when $B_2 < B_1 e$. In this latter case $$\Delta n_o = eB_1 \ln(B_2/B_1) \quad (12)$$

(Equations 11 and 12 are derived by differentiating equation 7 with respect to $r$ and setting this quantity equal to 0. This determines $r_{ext}$, the $r$ at which the extremum of $A_2(r)$ occurs. Then $r_{ext}$ is substituted into the equality $B_2 = \Delta n_o A_2(r_{ext})$ and the equation is solved for $\Delta n_o$).

To summarize, in the preferred embodiment the desired bandwidth for a particular application is set and an appropriate value of $z/y$ is determined from equation (5). Preferably the fiber is designed using two contributions to the refractive index gradient or two combinations of contributions each respectively having a profile attributable to it given by equations 6 and 7 with $\alpha$ chosen to be an $\alpha_{opt}$. The four parameters $B_1$, $B_2$, $\Delta n_o$ and the means of producing the contribution determine the particular fiber design used from the family described by equations 6 and 7. The four parameters chosen should yield compensation corresponding to the desired $z/y$ ratio. The various combinations of the four parameters which give the compensation corresponding to $z/y$ are indicated by equations (10), (11), (12) and (9). Practical considerations then determine the final parameters used. For example, the present choice of dopants available for use in fibers is limited, the amounts of dopant which can be put in the core of a fiber is also restricted, and the coefficient of expansion of the core and cladding must be sufficiently similar to allow fabrication of the fiber. Within the framework of equations (9), (10), (11), and (12), the four parameters are varied until a set of practically achievable parameters is determined. Once the parameters are determined, the $\alpha_{opt}$ of equations 6 and 7 is set by the particular relation followed to reduce modal dispersion at $\lambda_o$, e.g., the relationship of equation (2).

Implicit in this discussion is the use of various quantities such as $N_o$, $d^2n_o/d\lambda$, $d\alpha_{actual}/d\lambda$, and $d\alpha_{opt}/d\lambda$. These qualities are obtainable by common techniques. The desired values are derived from a plot of refractive index versus wavelength. The measurements necessary to obtain such plots are described in Gloge et al *Elect. Letts.*, 11, 19 (1975), where values for germanium are given.

Compensation within practical limitations is achieved by using a germanium dopant such as $GeO_2$ or a titanium dopant such as $TiO_2$ (both polarizability varying contributors) as contribution two, and a boron compound such as $B_2O_3$ (primarily a density varying contributor when used in a silica fiber) as contribution one. It should be noted that the various equations derived involve some approximation and serve as a good tool in designing a desired fiber. Final values are determined by use of a controlled sample.

4. Fabrication

Fibers useful in the practice of this invention are fabricated using standard techniques. For example, a modified chemical vapor deposition technique (see MacChesney et al. *Proceedings IEEE*, 62 (9) 1280 (1974)) is used to deposit dopants, in the prescribed manner, inside tubes such as commercial silica tubes or doped silica tubes, which are then collapsed and drawn into fibers. If large $\Delta$'s are desired, possible expansion mismatches between the cladding and the core necessitates maintaining the preform above the transition temperature of the core glass.

What is claimed is:

1. An optical fiber for guiding a spectrum of electromagnetic radiation of finite bandwidth comprising a core region surrounded by a cladding region wherein said core region has a radial refractive index profile which decreases toward said cladding characterized in that said radial refractive index profile is a composite profile which substantially lessens modal dispersion near a high intensity wavelength of said spectrum within said finite bandwidth which includes both shorter and longer wavelength electromagnetic radiation of lesser intensity, said composite profile being composed of at least two contributory profiles each associated with a different index-varying contribution wherein at least two of said contributory profiles are different from said composite profile whereby the total dispersion for the said finite bandwidth is reduced relative to that resulting from a reference fiber in which the effective profile is the same as the said composite profile but in which said contributory profiles associated with said index-varying contributions are approximately the same.

2. The optical fiber of claim 1 wherein at least one of said index-varying contributions is a polarizability effect.

3. The optical fiber of claim 1 wherein at least one of said index-varying contributions is a density effect.

4. The optical fiber of claim 1 wherein at least one of said index-varying contributions is produced by distributing a dopant through said optical fiber.

5. The optical fiber of claim 1 wherein the fiber has a $\Delta n_o$ of at least 0.02 wherein $n_o$ is the refractive index at the center of said core region and $\Delta$ is equal to $(n_o-n_c)/n_c$, where $n_c$ is the refractive index of the cladding.

* * * * *